US012198587B2

(12) United States Patent
Aoki et al.

(10) Patent No.: US 12,198,587 B2
(45) Date of Patent: Jan. 14, 2025

(54) PROJECTION-TYPE DISPLAY APPARATUS

(71) Applicant: SEIKO EPSON CORPORATION, Tokyo (JP)

(72) Inventors: Toru Aoki, Shiojiri (JP); Hiroyuki Hosaka, Matsumoto (JP); Yusuke Komuro, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/239,926

(22) Filed: Aug. 30, 2023

(65) Prior Publication Data

US 2024/0071270 A1 Feb. 29, 2024

(30) Foreign Application Priority Data

Aug. 31, 2022 (JP) ................................ 2022-137620

(51) Int. Cl.
*G09G 3/00* (2006.01)

(52) U.S. Cl.
CPC ............ *G09G 3/007* (2013.01); *G09G 3/002* (2013.01); *G09G 2340/0407* (2013.01)

(58) Field of Classification Search
CPC . G09G 3/007; G09G 3/002; G09G 2340/0407
See application file for complete search history.

(56) References Cited

U.S. PATENT DOCUMENTS

2015/0219983 A1* 8/2015 Mashitani ............ H04N 9/3188 353/121
2015/0371577 A1* 12/2015 Hosaka .................. G09G 3/007 345/56
2020/0213567 A1 7/2020 Okada et al.
2021/0076015 A1 3/2021 Hosaka

FOREIGN PATENT DOCUMENTS

JP 2020-107984 A 7/2020
JP 2021-039289 A 3/2021

* cited by examiner

*Primary Examiner* — Adam R. Giesy
(74) *Attorney, Agent, or Firm* — Oliff PLC

(57) ABSTRACT

A projection-type display apparatus includes a liquid crystal panel including a panel pixel, an optical path shifting element that shifts a projected pixel projected from the panel pixel, and a display control circuit that controls the liquid crystal panel and the optical path shifting element. The display control circuit supplies, to the liquid crystal panel, the same data signal and controls the projected pixel to be at a same position in a unit period f1-1 and a unit period f2-1 period, and controls the optical path shifting element to cause the position of the projected pixel in each of a unit period f1-2 to a unit period f1-4, to be different from the position of the projected pixel in a respective one of a unit period f2-2 to a unit period f2-4.

4 Claims, 10 Drawing Sheets

FIG. 11
• ODD FRAME
Bk1
A11
B11
A21
D11
C11
D21
A12
B12
A22
• EVEN FRAME
A11
B11
A21
D11
C11
D21
A12
B12
A22

COMPARATIVE EXAMPLE:
ODD-NUMBERED FRAME ONLY

EMBODIMENT

PROJECTION-TYPE DISPLAY APPARATUS

The present application is based on, and claims priority from JP Application Serial Number 2022-137620, filed Aug. 31, 2022, the disclosure of which is hereby incorporated by reference herein in its entirety.

BACKGROUND

1. Technical Field

The present disclosure relates to a projection-type display apparatus.

2. Related Art

With regard to a projection-type display apparatus that projects image light generated by a liquid crystal panel or the like onto a screen or the like, a technique is known that artificially increases resolution by an optical path shifting element. More specifically, in the projection-type display apparatus, a projection position of one panel pixel in the liquid crystal panel is shifted for each of a plurality of unit periods in one frame period, when expressing a plurality of pixel data in video data (see JP-A-2020-107984, for example).

However, with the technique described above, there is a problem in that the display quality deteriorates when a specific display pattern appears, as a still image, in an image designated by the video data. In light of such circumstances as described above, an advantage of an aspect of the present disclosure is to provide a technique for suppressing deterioration in display quality even when a specific display pattern appears in an image designated by video data.

SUMMARY

In order to solve the problem described above, a projection-type display apparatus according to an aspect of the present disclosure includes a liquid crystal panel including a panel pixel, an optical path shifting element configured to shift a position of a projected pixel projected from the panel pixel in each of n unit periods from a first unit period to an n-th unit period included in one frame period, n being an integer of two or greater, and a display control circuit configured to control the liquid crystal panel and the optical path shifting element, in which the display control circuit supplies a data signal corresponding to pixel data constituting video data, to the panel pixel in each of the unit periods, controls the shift of the position of the projected pixel with respect to the optical path shifting element in each of the unit periods, supplies, to the liquid crystal panel, the data signal corresponding to the same pixel data and controls the position of the projected pixel to be at a same position in each of an initial first unit period of the n unit periods in a first frame period and an initial first unit period of the n unit periods in a second frame period subsequent to the first frame period, and controls the optical path shifting element to cause the position of the projected pixel in each of a second unit period to the n-th unit period of the first frame period, to be different from the position of the projected pixel in a respective one of the second unit period to the n-th unit period of the second frame period.

BRIEF DESCRIPTION OF THE DRAWINGS

FIG. 9 is a diagram illustrating a relationship between an array of video pixels and an array of panel pixels, and the like.

DESCRIPTION OF EMBODIMENTS

An electro-optical device according to embodiments will be described below with reference to the accompanying drawings. Note that in each of the drawings, dimensions and scale of each part are made different from actual ones as appropriate. Further, embodiments described below are suitable specific examples, and various technically preferable limitations are applied, but the scope of the disclosure is not limited to these embodiments unless they are specifically described in the following description as limiting the disclosure.

Figure 1:
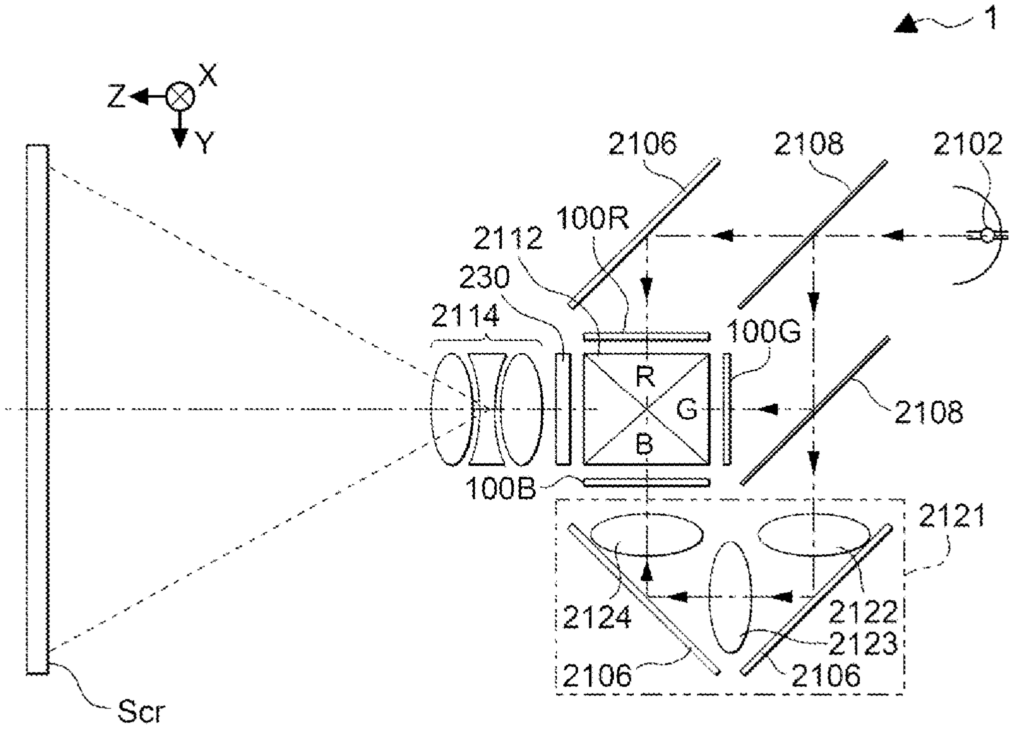
FIG. 1 is a diagram illustrating a projection-type display apparatus according to an embodiment.

FIG. 1 is a diagram illustrating an optical configuration of a projection-type display apparatus 1 according to an embodiment. As illustrated in the drawing, the projection-type display apparatus 1 includes liquid crystal panels 100R, 100G, and 100B. Further, a lamp unit 2102 including a white light source such as a halogen lamp is provided inside the projection-type display apparatus 1. Projection light emitted from the lamp unit 2102 is split into three primary colors of red (R), green (G), and blue (B) by three mirrors 2106 and two dichroic mirrors 2108 disposed inside the projection-type display apparatus 1. Of the light of the primary colors, light of R, light of G, and light of B are incident on the liquid crystal panel 100R, the liquid crystal panel 100G, and the liquid crystal panel 100B, respectively.

Note that since an optical path of B is longer than each of optical paths of R and G, it is necessary to prevent a loss in the B optical path. Thus, a relay lens system 2121 including an incidence lens 2122, a relay lens 2123, and an emission lens 2124 is provided at the B optical path.

The liquid crystal panel 100R includes a plurality of pixel circuits. Each of the plurality of pixel circuits includes a liquid crystal element. As described below, by the liquid crystal element of the liquid crystal panel 100R being driven based on a data signal corresponding to R, the liquid crystal panel 100R comes to have a transmittance corresponding to the data signal. Thus, in the liquid crystal panel 100R, a transmitted image of R is generated by individually controlling the transmittance of the liquid crystal element. Similarly, in the liquid crystal panel 100G, a transmitted image of G is generated based on a data signal corresponding to G, and in the liquid crystal panel 100B, a transmitted image of B is generated based on a data-signal corresponding to B.

The transmitted images of each of the colors generated by the liquid crystal panels 100R, 100G, and 100B, respectively, are incident on a dichroic prism 2112 from three directions. At the dichroic prism 2112, the light of R and the light of B are refracted at 90 degrees, whereas the light of G travels in a straight line. Thus, the dichroic prism 2112 combines the images of the respective colors. A composite image generated by the dichroic prism 2112 is incident on a projection lens 2114 via an optical path shifting element 230.

The projection lens 2114 enlarges and projects the composite image transmitted through the optical path shifting element 230, onto a screen Scr.

The optical path shifting element 230 shifts the composite image emitted from the dichroic prism 2112. More specifically, the optical path shifting element 230 shifts the image projected onto the screen Scr in the left-right direction and/or in the downward direction with respect to a projection surface.

Note that, while the transmitted images by the liquid crystal panels 100R and 100B are projected after being reflected by the dichroic prism 2112, the transmitted image by the liquid crystal panel 100G travels in a straight line and is projected. Thus, the respective transmitted images of the liquid crystal panels 100R and 100B are laterally inverted with respect to the transmitted image of the liquid crystal panel 100G.

For convenience of description, with the projection surface of the screen Scr viewed from the projection-type display apparatus 1, the left-right direction is defined as an X-axis and the up-down direction is defined as a Y-axis. Note that, of the left-right directions along the X-axis, the right direction is referred to as an X direction, and the left direction is referred to as a direction opposite to the X direction. Further, of the up-down directions along the Y-axis, the downward direction is referred to as a Y direction, and the upward direction is referred to as a direction opposite to the Y direction. The projection direction of the projection-type display apparatus 1 is defined as a Z direction.

Note that, in the embodiment, the Y-axis is an example of a first axis, and the X-axis is an example of a second axis.

Figure 2:
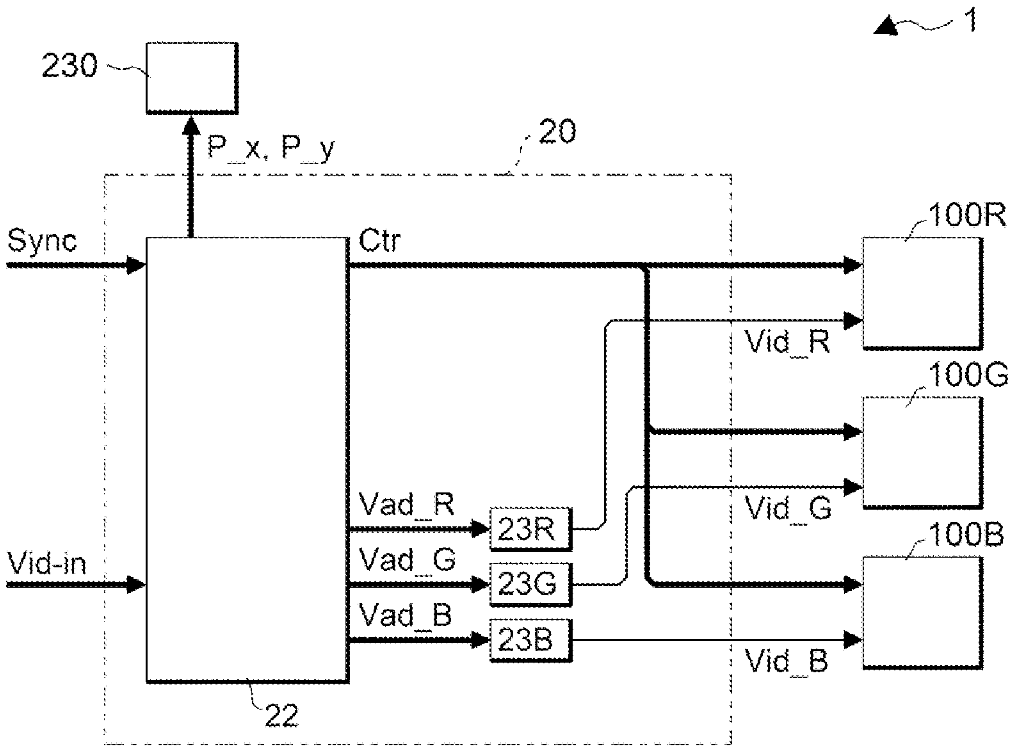
FIG. 2 is a block diagram illustrating a configuration of the projection-type display apparatus.

FIG. 2 is a block diagram illustrating an electrical configuration of the projection-type display apparatus 1. As illustrated in the drawing, the projection-type display apparatus 1 includes a display control circuit 20, the above-described liquid crystal panels 100R, 100G, and 100B, and the optical path shifting element 230.

Video data Vid-in is supplied from a higher-level device such as a host device (not illustrated) in synchronization with a synchronization signal Sync. The video data Vid-in designates a gray scale level of a pixel in an image to be displayed for each of RGB, for example, by 8 bits.

Note that the pixel in the image designated by the video data Vid-in is referred to as a video pixel, data of the video pixel is referred to as pixel data, and the pixel in the composite image by the liquid crystal panels 100R, 100G, and 100B is referred to as a panel pixel. Further, the position of the panel pixel shifted by the optical path shifting element 230 and projected onto the screen Scr is referred to as a projection position.

In the composite image of the liquid crystal panels 100R, 100G, and 100B, the panel pixels are arrayed in a matrix in the vertical and lateral directions. In this embodiment, the array of the video pixels whose gray scale levels are designated by the video data Vid-in is twice as large as the array of the panel pixels combined by the liquid crystal panels 100R, 100G, or 100B, in both the vertical direction and the lateral direction.

In this embodiment, a color image projected onto the screen Scr is expressed by combining the transmitted images of the liquid crystal panels 100R, 100G, and 100B. Thus, the pixel, which is the minimum unit of the color image, can be divided into a red sub-pixel by the liquid crystal panel 100R, a green sub-pixel by the liquid crystal panel 100G, and a blue sub-pixel by the liquid crystal panel 100B. However, when there is no need to specify the colors of the sub-pixels in the liquid crystal panels 100R, 100G, and 100B, or, for example, when handling only the brightness as a problem, the sub-pixels do not need to be referred to as sub-pixels. Therefore, in the description herein, the panel pixel is also used as a display unit of the liquid crystal panels 100R, 100G, and 100B.

The synchronization signal Sync includes a vertical synchronization signal that instructs a start of vertical scanning of the video data Vid-in, a horizontal synchronization signal that instructs a start of horizontal scanning, and a clock signal that indicates a timing for one video pixel.

The display control circuit 20 includes a processing circuit 22, and conversion circuits 23R, 23G, and 23B.

The processing circuit 22 accumulates the video data Vid-in from the higher-level device for one or two or more frame periods, then reads the pixel data of the video pixel corresponding to the projection position by the optical path shifting element 230, and outputs the pixel data for each of RGB components. Note that, of pixel data V output from the processing circuit 22, the R component is referred to as pixel data Vad_R, the G component is referred to as pixel data Vad_G, and the B component is referred to as pixel data Vad_B.

In the projection-type display apparatus 1, the projection position changes for each unit period obtained by dividing one frame period into four, but eight of the projection positions can be set in eight unit periods in two consecutive frame periods. However, in this embodiment, the number of projection positions in the eight unit periods is set to be seven, as will be described below.

Each of the unit periods is a period for causing a user to visually recognize an image, achieved by reducing the resolution of an image for one frame period designated by the video data Vid-in to one fourth of the original resolution, as the composite image by the liquid crystal panels 100R, 100G, and 100B.

The processing circuit 22 controls the projection position by the optical path shifting element 230 in each unit period. More specifically, with respect to the optical path shifting element 230, the processing circuit 22 controls a shift in a direction along the X-axis using a control signal P_x, and controls a shift in a direction along the Y-axis using a control signal P_y.

Note that the projection position for each unit period, and which of the video pixels, designated by the video data Vid-id in correspondence to each of the projection positions, is expressed by the panel pixel will be described later in more detail.

Further, the processing circuit 22 also generates a control signal Ctr for controlling the liquid crystal panels 100R, 100G, and 100B for each unit period.

The conversion circuit 23R converts the pixel data Vad_R into a data signal Vid_R of an analog voltage, and supplies it to the liquid crystal panel 100R. The conversion circuit 23G converts the pixel data Vad_G into a data signal Vid_G of an analog voltage, and supplies it to the liquid crystal panel 100G. The conversion circuit 23B converts the pixel data Vad_B into a data signal Vid_B of an analog voltage, and supplies it to the liquid crystal panel 100B.

Next, the liquid crystal panels 100R, 100G, and 100B will be described. The liquid crystal panels 100R, 100G, and 100B only differ in the color of incident light, that is, the wavelength, and otherwise have the same structure. Thus, the liquid crystal panels 100R, 100G, and 100B will be generally described below using a reference numeral 100 without specifying the color.

Figure 3:
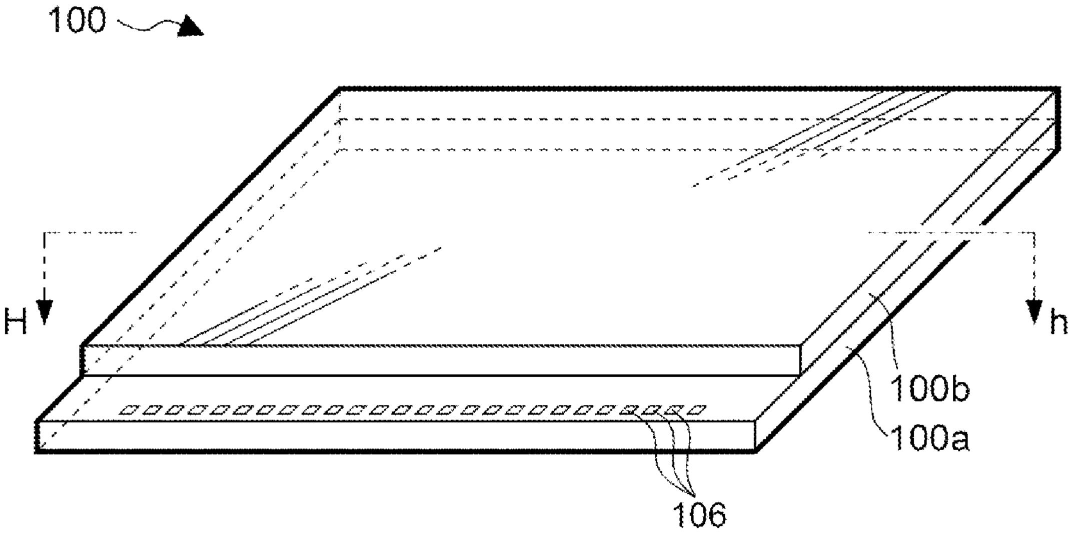
FIG. 3 is a perspective view illustrating a configuration of a liquid crystal panel in the projection-type display apparatus.
Figure 4:
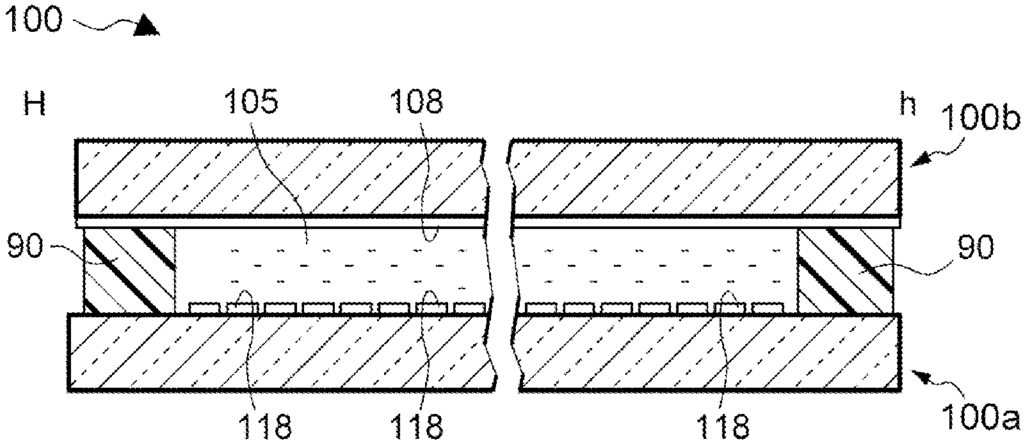
FIG. 4 is a cross-sectional view illustrating a structure of the liquid crystal panel.

FIG. 3 is a diagram illustrating main portions of the liquid crystal panel 100, and FIG. 4 is a cross-sectional view taken along a line H-h in FIG. 3.

As illustrated in these drawings, in the liquid crystal panel 100, an element substrate 100*a* on which pixel electrodes 118 are provided and a counter substrate 100*b* on which a common electrode 108 is provided are bonded to each other by a seal material 90, so that electrode-formed surfaces thereof face each other with a constant gap therebetween, and liquid crystal 105 is sealed in the gap.

As the element substrate 100*a* and the counter substrate 100*b*, transmissive substrates such as glass or quartz substrates are used. As illustrated in FIG. 3, one side of the element substrate 100*a* protrudes from the counter substrate 100*b*. In this protruding region, a plurality of terminals 106 are provided along the lateral direction in the drawing. One end of a flexible printed circuit (FPC) substrate (not illustrated) is coupled to the plurality of terminals 106. Note that the other end of the FPC substrate is coupled to the display control circuit 20, and the above-described various signals and the like are supplied thereto.

On the surface of the element substrate 100*a* facing the counter substrate 100*b*, the pixel electrodes 118 are formed by patterning a transparent conductive layer such as indium tin oxide (ITO), for example.

Further, various elements other than the electrodes are provided on the facing surface of the element substrate 100*a* and the facing surface of the counter substrate 100*b*, but are not illustrated in the drawings.

Figure 5:
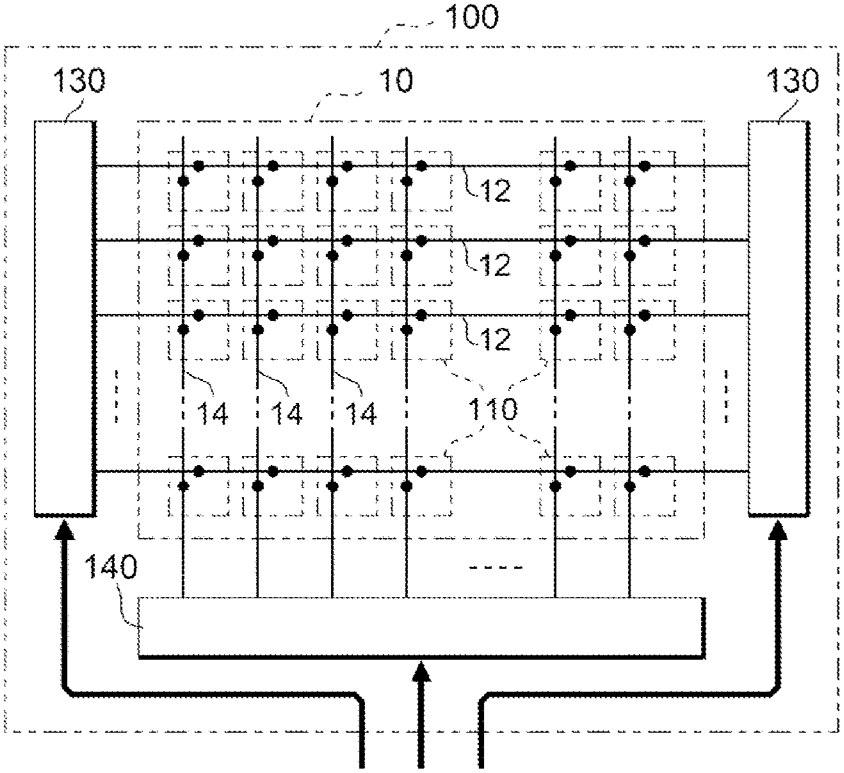
FIG. 5 is a block diagram illustrating an electrical configuration of the liquid crystal panel.

FIG. 5 is a block diagram illustrating an electrical configuration of the liquid crystal panel 100. In the liquid crystal panel 100, scanning line drive circuits 130 and a data line drive circuit 140 are provided at the periphery of a display region 10.

In the display region 10 of the liquid crystal panel 100, pixel circuits 110 are arrayed in a matrix. More specifically, in the display region 10, a plurality of scanning lines 12 are provided extending in the lateral direction in the drawing, and a plurality of data lines 14 are provided extending in the vertical direction, while the data lines 14 are electrically insulated from the scanning lines 12. The pixel circuits 110 are provided in a matrix so as to correspond to the intersections between the plurality of scanning lines 12 and the plurality of data lines 14.

When the number of the scanning lines 12 is m and the number of the data lines 14 is n, the pixel circuits 110 are arrayed in a matrix of m rows and n columns. m and n are each an integer of 2 or greater. With respect to the scanning lines 12 and the pixel circuits 110, in order to distinguish the rows of the matrix from each other, the rows may be referred as a 1st, 2nd, 3rd . . . (m−1)-th, and m-th row in ascending order from the top in the drawing. Similarly, with respect to the data lines 14 and the pixel circuits 110, in order to distinguish the columns of the matrix from each other, the columns may be referred as a 1st, 2nd, 3rd . . . (n−1)-th, and n-th column in ascending order from the left in the drawing.

The scanning line drive circuit 130 selects the scanning lines 12 one by one, for example, in order of the 1st, 2nd, 3rd . . . and m-th rows under the control of the display control circuit 20, and sets a scanning signal to the selected scanning line 12 to the H level. Note that the scanning line drive circuit 130 sets the scanning signals to the scanning lines 12 other than the selected scanning line 12, to the L level.

The data line drive circuit 140 latches one row of the data signals supplied from the circuit of the corresponding color, that is, from one of processing circuits 220R, 220G, or 220B, and in a period in which the scanning signal to the scanning line 12 is set to the H level, outputs the data signal to the pixel circuit 110 located at that scanning line 12 via the data line 14.

Figure 6:
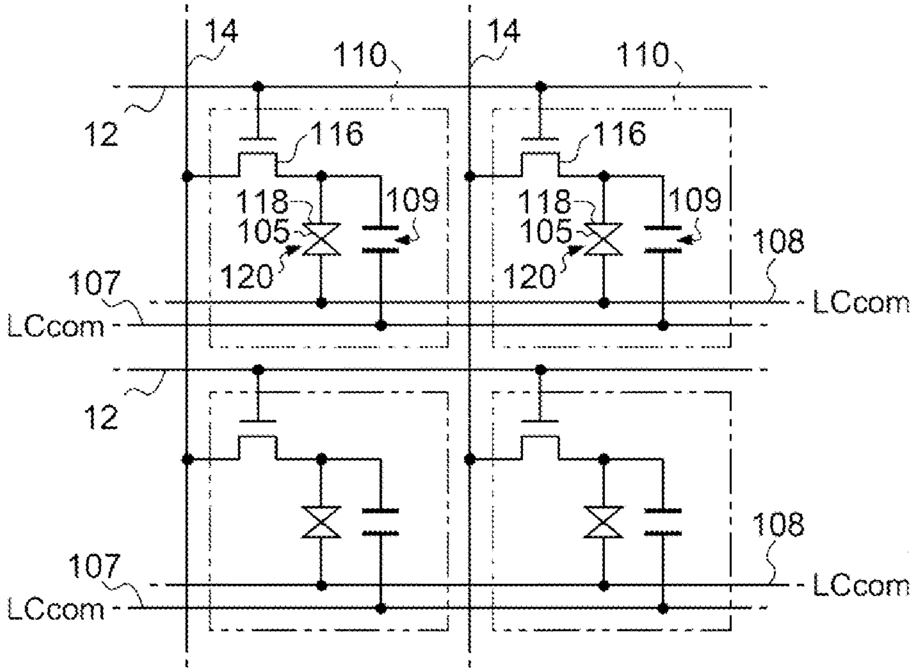
FIG. 6 is a diagram illustrating a configuration of a pixel circuit in the liquid crystal panel.

FIG. 6 is a diagram illustrating an equivalent circuit of a total of four of the pixel circuits 110, in two rows and two columns, corresponding to the intersections between two of the adjacent scanning lines 12 and two of the adjacent data lines 14.

As illustrated in the drawing, the pixel circuit 110 includes a transistor 116 and a liquid crystal element 120. The transistor 116 is, for example, an n-channel thin film transistor. In the pixel circuit 110, a gate node of the transistor 116 is coupled to the scanning line 12, a source node thereof is coupled to the data line 14, and a drain node thereof is coupled to the pixel electrode 118 having a square shape in plan view.

The common electrode 108 is provided commonly for all of the pixels, so as to face the pixel electrodes 118. A voltage LCcom is applied to the common electrode 108. The liquid crystal 105 is interposed between the pixel electrodes 118 and the common electrode 108, as described above. Thus, the liquid crystal element 120, in which the liquid crystal 105 is interposed between the pixel electrodes 118 and the common electrode 108, is formed for each of the pixel circuits 110.

Further, a storage capacitor 109 is provided in parallel with the liquid crystal element 120. One end of the storage capacitor 109 is coupled to the pixel electrode 118, while the other end thereof is coupled to a capacitor line 107. A temporally constant voltage, for example, the same voltage LCcom as the voltage applied to the common electrode 108, is applied to the capacitor line 107. Since the pixel circuits 110 are arrayed in the matrix in the lateral direction, which is the extending direction of the scanning lines 12, and in the vertical direction, which is the extending direction of the data lines 14, the pixel electrodes 118 included in the pixel circuits 110 are also arrayed in the lateral direction and the vertical direction.

In the scanning line 12 in which the scanning signal is set to the H level, the transistor 116 of the pixel circuit 110 provided corresponding to that scanning line 12 is turned on. Since the data line 14 and the pixel electrode 118 are electrically coupled to each other as a result of the transistor 116 being turned on, the data signal supplied to the data line 14 reaches the pixel electrode 118 through the transistor 116 that has been turned on. When the scanning line 12 is set to the L level, the transistor 116 is turned off, but the voltage of the data signal, which has reached the pixel electrode 118, is retained by capacitive properties of the liquid crystal element 120 and the storage capacitor 109.

As is well known, in the liquid crystal element 120, the liquid crystal molecular alignment changes in accordance with the electric field generated by the pixel electrode 118 and the common electrode 108. Thus, the liquid crystal element 120 has a transmittance corresponding to the effective value of the applied voltage.

Note that a region functioning as the pixel in the liquid crystal element 120, that is, a region having the transmittance corresponding to the effective value of the voltage is a region in which the pixel electrode 118 and the common electrode 108 overlap each other when the element substrate 100*a* and the counter substrate 100*b* are viewed in plan view. Since the pixel electrode 118 has a square shape in plan view, the shape of the pixel of the liquid crystal panel 100 is also a square shape.

Further, in this embodiment, it is assumed that the normally black mode is employed in which the transmittance increases as the voltage applied to the liquid crystal element 120 increases.

An operation of supplying the data signal to the pixel electrode 118 of the liquid crystal element 120 is performed in order of the 1st, 2nd, 3rd . . . and m-th rows in one unit period. As a result, a voltage corresponding to the data signal is retained in each of the liquid crystal elements 120 of the pixel circuits 110 arrayed in m rows and n columns, each of the liquid crystal element 120 comes to have a target transmittance, and the transmitted image of the corresponding color is generated by the liquid crystal elements 120 arrayed in m rows and n columns.

In this way, the transmitted image is generated for each of RGB, and the color image obtained by combining RGB is projected onto the screen Scr.

The pixel data Vad_R, Vad_G, and Vad_B of the video pixel output from the processing circuit 22 corresponding to one unit period are the pixel data of the video pixel corresponding to that unit period. Thus, in that unit period, a color composite image corresponding to a projection position is projected at that projection position.

As described above, the video pixels in the video data Vid-in are arrayed in 2m rows and 2n columns, which are twice as large in both the vertical direction and the lateral direction compared with the m rows and n columns in which the panel pixels are arrayed in the liquid crystal panels 100R, 100G, and 100B.

In other words, the array of the panel pixels is half the size of the array of the video pixels in both the vertical direction and the lateral direction. Thus, in this embodiment, in one frame period, one panel pixel is shifted at a total of four positions, namely, two positions in the vertical direction times two positions in the lateral direction, so that the one panel pixel is visually recognized as if it is indicating four of the video pixels designated by the video data Vid-in.

However, in a configuration in which the video pixels are expressed by simply shifting one panel pixel to the four positions in one frame period, the display quality may deteriorate as described below. Thus, in this embodiment, the projection position of one panel pixel is shifted in each of eight unit periods over two frame periods, and further, the direction in which the projection position is shifted for each of the unit periods in an odd-numbered frame period and the direction in which the projection position is shifted for each of the unit periods in an even-numbered frame period are set to be opposite to each other.

Figure 7:
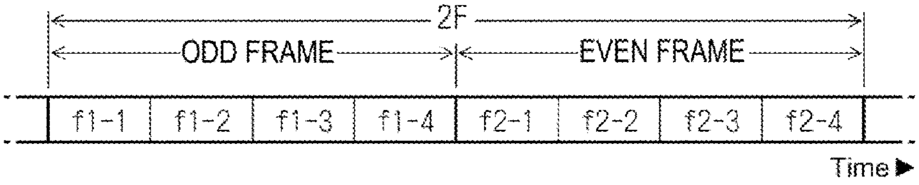
FIG. 7 is a diagram illustrating frame periods and unit periods in the projection-type display apparatus.

FIG. 7 illustrates a diagram for describing a relationship between the frame period and the unit period in this embodiment. As illustrated in the drawing, in this embodiment, a two frame (2F) period is divided into a preceding odd-numbered frame (odd frame) period and a succeeding even-numbered frame (even frame) period.

The odd-numbered frame period is divided into four unit periods. In order to distinguish the four unit periods in the odd-numbered frame period from each other, reference signs f1-1, f1-2, f1-3, and f1-4 are assigned in a chronological order for convenience. Similarly, the even-numbered frame period is divided into four unit periods. In order to distinguish the four unit periods in the even-numbered frame period, reference signs f2-1, f2-2, f2-3, and f2-4 are assigned in the chronological order for convenience.

Note that the number of unit periods included in each of the odd-numbered frame period and the even-numbered frame period, which is "4" in this case, is an example of an integer n of 2 or greater. Further, the odd-numbered frame period is an example of a first frame period, and the even-numbered frame period is an example of a second frame period. The unit periods f1-1 and f2-1 are examples of a first unit period, the unit periods f1-2 and f2-2 are examples of a second unit period, the unit periods f1-3 and f2-3 are examples of a third unit period, and the unit periods f1-4 and f2-4 are examples of a fourth unit period.

One frame period is a period in which one frame of the image designated by the video data Vid-in from the higher-level device is supplied. When the frequency of the vertical synchronization signal included in the synchronization signal Sync is 60 Hz, one frame period is 16.7 milliseconds corresponding to one cycle. In this case, the length of each of the unit periods is ¼ of the length of one frame period, which is 4.17 milliseconds.

Figure 8:
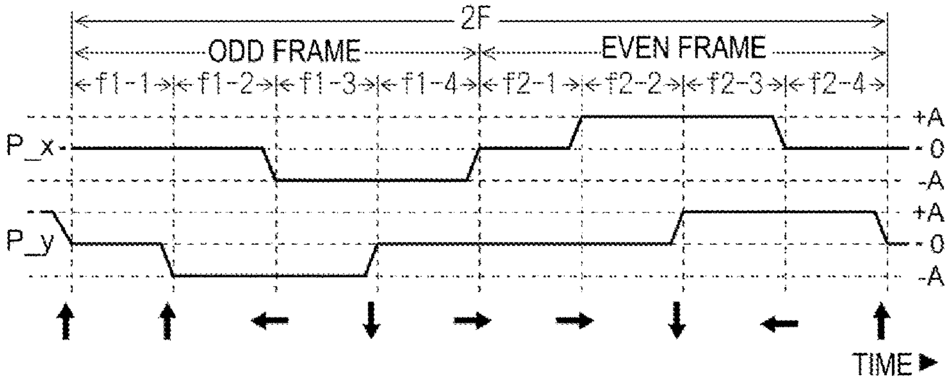
FIG. 8 is a diagram illustrating an operation of an optical path shifting element in the embodiment.

FIG. 8 is a diagram illustrating an example of waveforms of the control signals P_x and P_y supplied to the optical path shifting element 230.

The optical path shifting element 230 shifts the image projected onto the screen Scr in the X-axis and the Y-axis with respect to the projection surface. For convenience, an amount of the shift will be described in terms of the size of the pixel projected onto the screen Scr, that is, the size of the panel pixel.

Each of the control signals P_x and P_y has a level of one of three values of +A, 0, and −A, except for during a rear-end period of each of the unit periods f1-1 to f1-4 and f2-1 to f2-4. The levels of the control signals P_x and P_y change in the rear end period. The rear end period is a period corresponding to a vertical scanning flyback period.

Note that the level of the control signal P_x or P_y may be constant over two consecutive unit periods.

For convenience of description, the projection position in the period, other than the rear end period, of the unit period f1-1 in the odd-numbered frame period, that is, the projection position in the period in which the levels of the control signals P_x and P_y are 0 is set as a reference position.

When the level of the control signal P_x is +A, the optical path shifting element 230 shifts the projection position from the reference position by half of the panel pixel in the X direction, and when the level of the control signal P_x is −A, the optical path shifting element 230 shifts the projection position from the reference position by half of the panel pixel in the direction opposite to the X direction.

When the level of the control signal P_y is +A, the optical path shifting element 230 shifts the projection position from the reference position by half of the panel pixel in the Y direction, and when the level of the control signal P_y is −A, the optical path shifting element 230 shifts the projection position from the reference position by half of the panel pixel in the direction opposite to the Y direction.

Thus, for example, when the level of the control signal P_x is +A and the level of the control signal P_y is +A, the optical path shifting element 230 shifts the projection position from the reference position by half of the panel pixel in each of the X direction and the Y direction.

Note that the arrow illustrated in the rear end period of each of the unit periods in FIG. 8 indicates in which direction the projection position is shifted when the levels of the control signals P_x and P_y are changed or maintained in that rear end period.

Further, the shift of the projection position by the optical path shifting element 230 may not be performed according to the levels of the control signals P_x and P_y, and may be accompanied by a time delay.

Next, a description will be made as to which video pixel among the video pixels of the video data Vid-in is expressed by the panel pixel of the liquid crystal panel 100 in the odd-numbered frame period and the even-numbered frame period.

Note that a panel pixel expressing a video pixel means that the panel pixel is in a state of having a transmittance designated by the pixel data corresponding to that video pixel.

Figure 9:
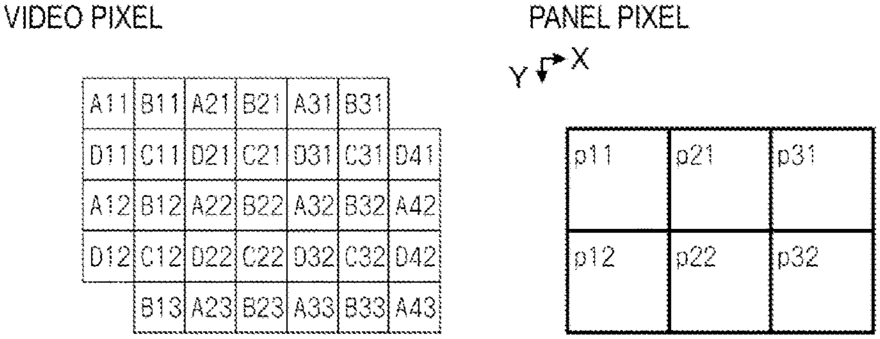

The left field in FIG. 9 is a diagram in which only a part of the video image designated by the video data Vid-in is extracted in order to describe the array of the video pixels. Further, the right field in the drawing is a diagram illustrating the array of the panel pixels corresponding to the array of the video pixels in the left field.

Note that, in the left field of FIG. 9, for convenience, A11, B11, A21, B21, A31, and B31 are respectively assigned to the video pixels of the first row as reference signs, in order to distinguish the video pixels of the video data Vid-in. Similarly, the second to fifth rows are also denoted by reference signs as illustrated in the drawing.

In the right field of FIG. 9, for convenience, p11, p21, and p31 are assigned to the panel pixels of the first row, and p12, p22, and p32 are assigned to the panel pixels of the second row as reference signs, in order to distinguish the panel pixels.

Figure 10:
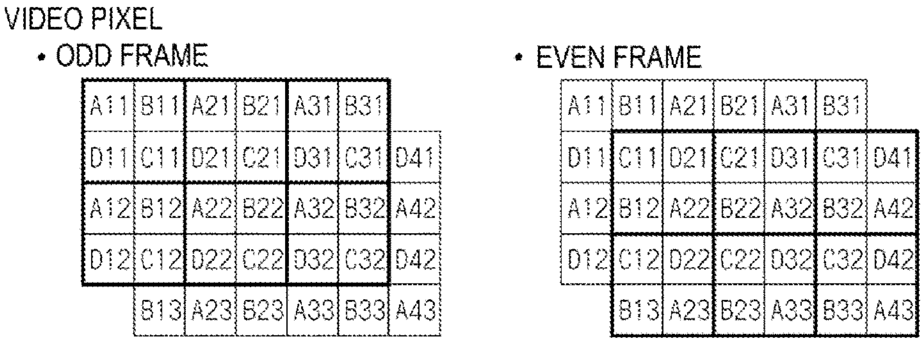
FIG. 10 is a diagram illustrating a correspondence relationship between the video pixels and the panel pixels in each of the frame periods in the embodiment.

FIG. 10 is a diagram illustrating the video pixels expressed by the panel pixels in the odd-numbered frame period and the even-numbered frame period. Note that, in the drawing, frames surrounded by the black thick line, which surrounds a total of four video pixels in 2 rows times 2 columns, indicates a group of the video pixels expressed by one panel pixel. The four video pixels expressed by one panel pixel are different between the odd-numbered frame period and the even-numbered frame period. More specifically, in this embodiment, the 2 times 2 video pixels expressed by one panel pixel in the even-numbered frame period are shifted by one video pixel in the right direction and one video pixel in the downward direction, from the 2×2 video pixels expressed by the panel pixel in the odd-numbered frame period.

Figure 11:
FIG. 11 is a diagram illustrating an order of the pixel data supplied to the panel pixel in the embodiment.

FIG. 11 is a diagram, while focusing on the panel pixel p11 in particular, illustrating an order in which the video pixels are expressed by the panel pixel p11 in each of the odd-numbered frame period and the even-numbered frame period. As illustrated in the drawing, the panel pixel p11 sequentially expresses the video pixels C11, B11, A11, and D11 in the unit periods f1-1 to f1-4 of the odd-numbered frame period, and sequentially expresses the video pixels C11, D21, A22, and B12 in the unit periods f2-1 to f2-4 of the even-numbered frame period. In other words, the array of the video pixels B11, A11, and D11 expressed by the panel pixel p11 in the odd-numbered frame, and the array of the video pixels B11, A11, and D11 expressed by the panel pixel p11 in the even-numbered frame have a rotational symmetry (two-fold symmetry) relationship about the video pixel C11, that is, the arrays overlap with each other when rotated by 180 degrees.

Figure 12:
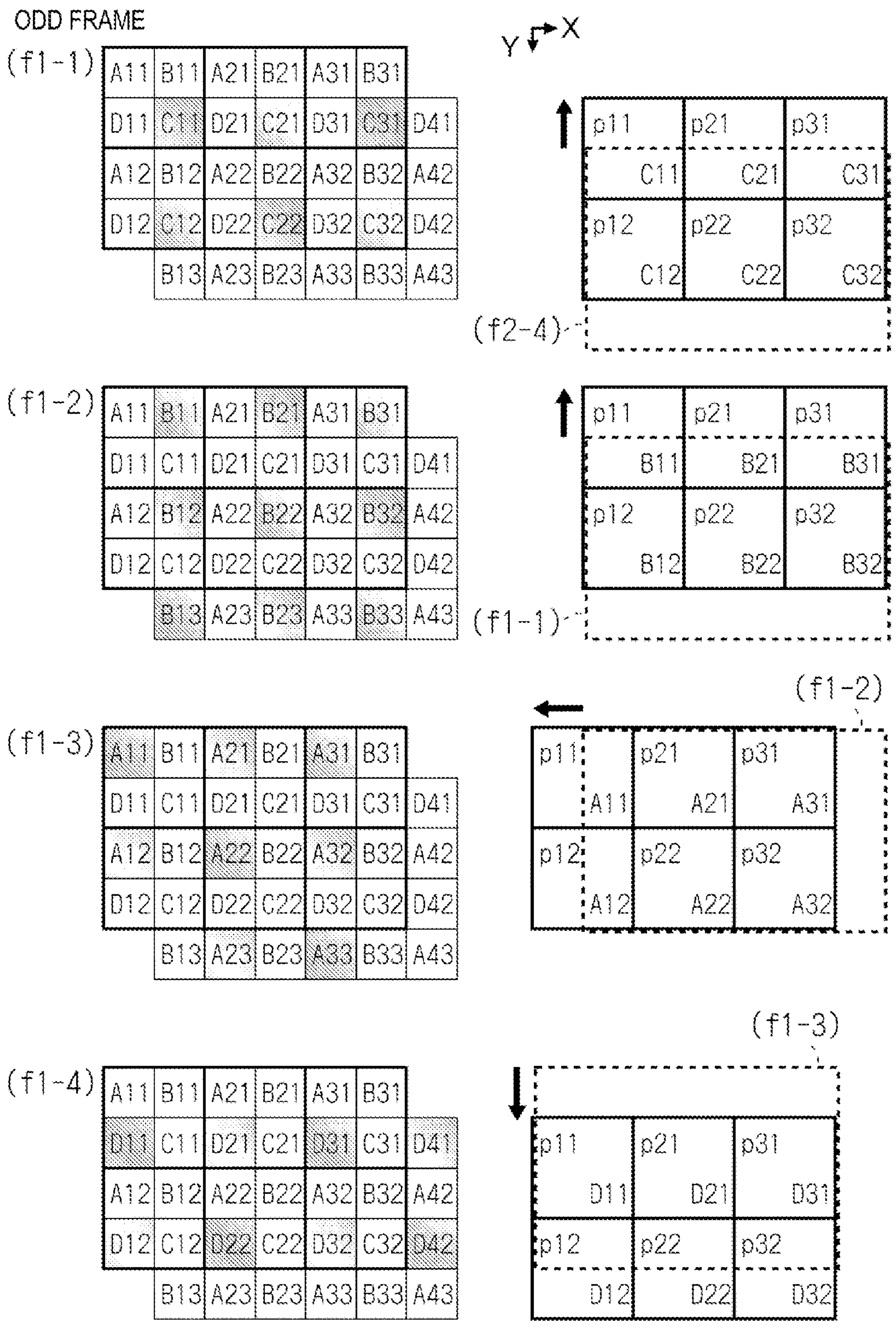
FIG. 12 is a diagram illustrating a relationship among the video pixels, the panel pixels, and projection positions in an odd-numbered frame period in the embodiment.
Figure 13:
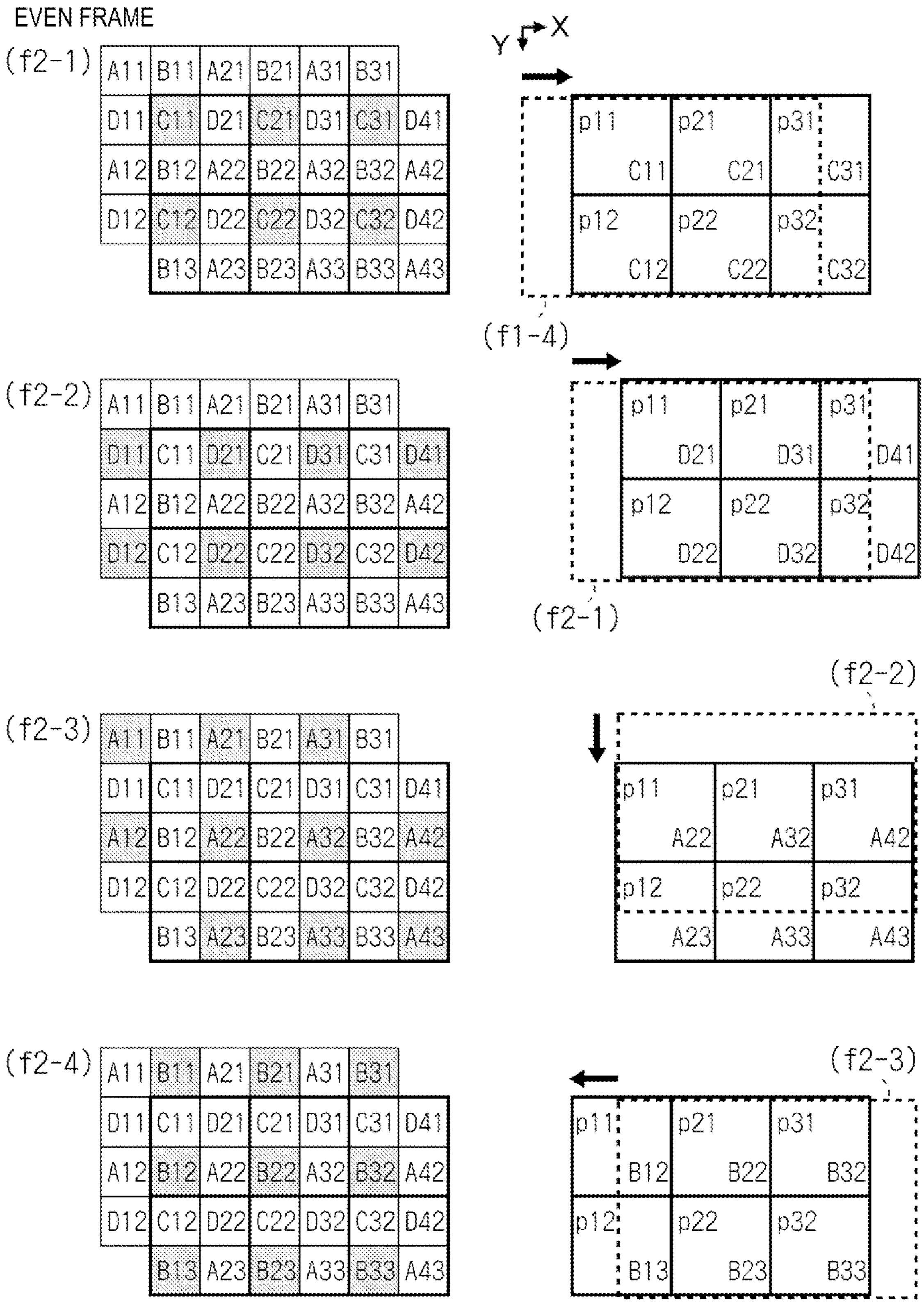
FIG. 13 is a diagram illustrating a relationship among the video pixels, the panel pixels, and the projection positions in an even-numbered frame period in the embodiment.

FIG. 12 and FIG. 13 are diagrams illustrating which video pixel is expressed at which projection position by the panel pixel in the projection-type display apparatus 1 according to the embodiment. More specifically, FIG. 12 is a diagram illustrating at which projection positions the video pixels in the left field of FIG. 9 are expressed by the six panel pixels in FIG. 9 in the unit periods f1-1 to f1-4 of the odd-numbered frame period. Further, FIG. 13 is a diagram illustrating at which projection positions the video pixels are expressed by the six panel pixels in the unit periods f2-1 to f2-4 of the even-numbered frame period.

For convenience, the projection position in the unit period f1-1 of the odd-numbered frame period is set as the reference position. As illustrated in FIG. 12, in the unit period f1-1 of the odd-numbered frame period, the panel pixels p11, p21, p31, p12, p22, and p32 express the hatched video pixels C11, C21, C31, C12, C22, and C32, respectively.

In the rear end period (vertical flyback period) of the unit period f1-1, the optical path shifting element 230 shifts the projection position from the reference position in the unit period f1-1 indicated by the dashed line, in the upward direction in the drawing (direction opposite to the Y direction) by 0.5 panel pixels. In the next unit period f1-2, the panel pixels p11, p21, p31, p12, p22, and p32 express the hatched video pixels B11, B21, B31, B12, B22, B32, respectively.

In the rear end period of the unit period f1-2, the optical path shifting element 230 shifts the projection position from the projection position in the unit period f1-2 indicated by the dashed line, in the left direction in the drawing (direction opposite to the X direction) by 0.5 panel pixels. In the next unit period f1-3, the panel pixels p11, p21, p31, p12, p22, and p32 express the hatched video pixels A11, A21, A31, A12, A22, and A32, respectively.

In the rear end period of the unit period f1-3, the optical path shifting element 230 shifts the projection position from the projection position in the unit period f1-3 indicated by the dashed line, in the downward direction in the drawing (Y direction) by 0.5 panel pixels. In the next unit period f1-4, the panel pixels p11, p21, p31, p12, p22, and p32 express the hatched video pixels D11, D21, D31, D12, D22, and D32, respectively.

In the rear end period of the unit period f1-4, the optical path shifting element 230 shifts the projection position from the projection position in the unit period f1-4 indicated by the dashed line, in the right direction in the drawing (X direction) by 0.5 panel pixels, thereby returning the projection position to the reference position. In the first unit period f2-1 in the even-numbered frame period, the panel pixels p11, p21, p31, p12, p22, and p32 express the hatched video pixels C11, C21, C31, C12, C22, and C32, respectively. In other words, a video pixel expressed by one panel pixel in the unit period 1-1 is the same as a video pixel expressed by the panel pixel in the unit period 2-1.

In the rear end period of the unit period f2-1, the optical path shifting element 230 shifts the projection position from the reference position in the unit period f2-1 indicated by the dashed line, in the right direction in the drawing (X direction) by 0.5 panel pixels. In the next unit period f2-2, the panel pixels p11, p21, p31, p12, p22, and p32 express the hatched video pixels D21, D31, D41, D22, D32, and D42, respectively.

In the rear end period of the unit period f2-2, the optical path shifting element 230 shifts the projection position from the projection position in the unit period f2-2 indicated by the dashed line, in the downward direction in the drawing (Y direction) by 0.5 panel pixels. Further, in the unit period f2-3, the panel pixels p11, p21, p31, p12, p22, and p32 express the hatched video pixels A22, A32, A42, A23, A33, and A42, respectively.

In the rear end period of the unit period f2-3, the optical path shifting element 230 shifts the projection position from the projection position in the unit period f2-3 indicated by the dashed line, in the left direction in the drawing (direction opposite to the X direction) by 0.5 panel pixels. In the next unit period f2-4, the panel pixels p11, p21, p31, p12, p22, and p32 express the hatched video pixels B12, B22, B32, B13, B23, and B33, respectively.

In the rear end period of the unit period f2-4, the optical path shifting element 230 shifts the projection position from the projection position in the unit period f2-4 indicated by the dashed line, in the upward direction in the drawing (direction opposite to the Y direction) by 0.5 panel pixels, thereby returning the projection position to the reference position.

As described above, in this embodiment, the optical path shifting element 230 is controlled so that each of the projected positions corresponding to the unit periods f1-2 to f1-4 in the odd-numbered frame period, are caused to be different from a respective one of the projected positions corresponding to the unit periods f2-2 to f2-4 in the even-numbered frame period. Specifically, the projected position corresponding to the unit period f1-2 is different from the projected position corresponding to the unit period f2-2, the projected position corresponding to the unit period f1-3 is different from the projected position corresponding to the unit period f2-3, and the projected position corresponding to the unit period f1-4 is different from the projected position corresponding to the unit period f2-4.

In this embodiment, even when a specific pattern appears in the video image designated by the video data Vid-in, deterioration in display quality is suppressed. This point will be described next.

Figure 14:
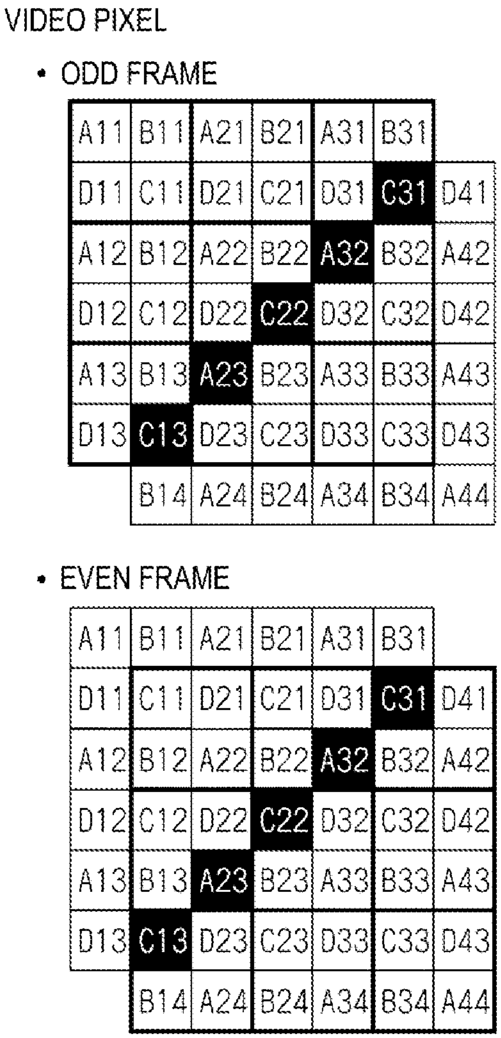
FIG. 14 is a diagram illustrating a specific pattern in the video data.

FIG. 14 is a diagram illustrating a specific pattern appearing in the video image designated by the video data Vid-in. As illustrated in this drawing, the specific pattern is a still image, and is, for example, a pattern having a diagonal line formed by black video pixels and angled at 45 degrees, with white video pixels as a background.

Note that, when the specific pattern is the still image, the video pixels in the odd-numbered frame period are the same as those in the even-numbered frame period. The "white video pixel" herein is a video pixel in which the highest (or nearly highest) gray scale level is designated for each of the three primary colors of red, green, and blue. Further, the "black video pixel" referred to here is a video pixel in which the lowest (or nearly lowest) gray scale level is designated for each of the three primary colors of red, green, and blue.

Figure 15:
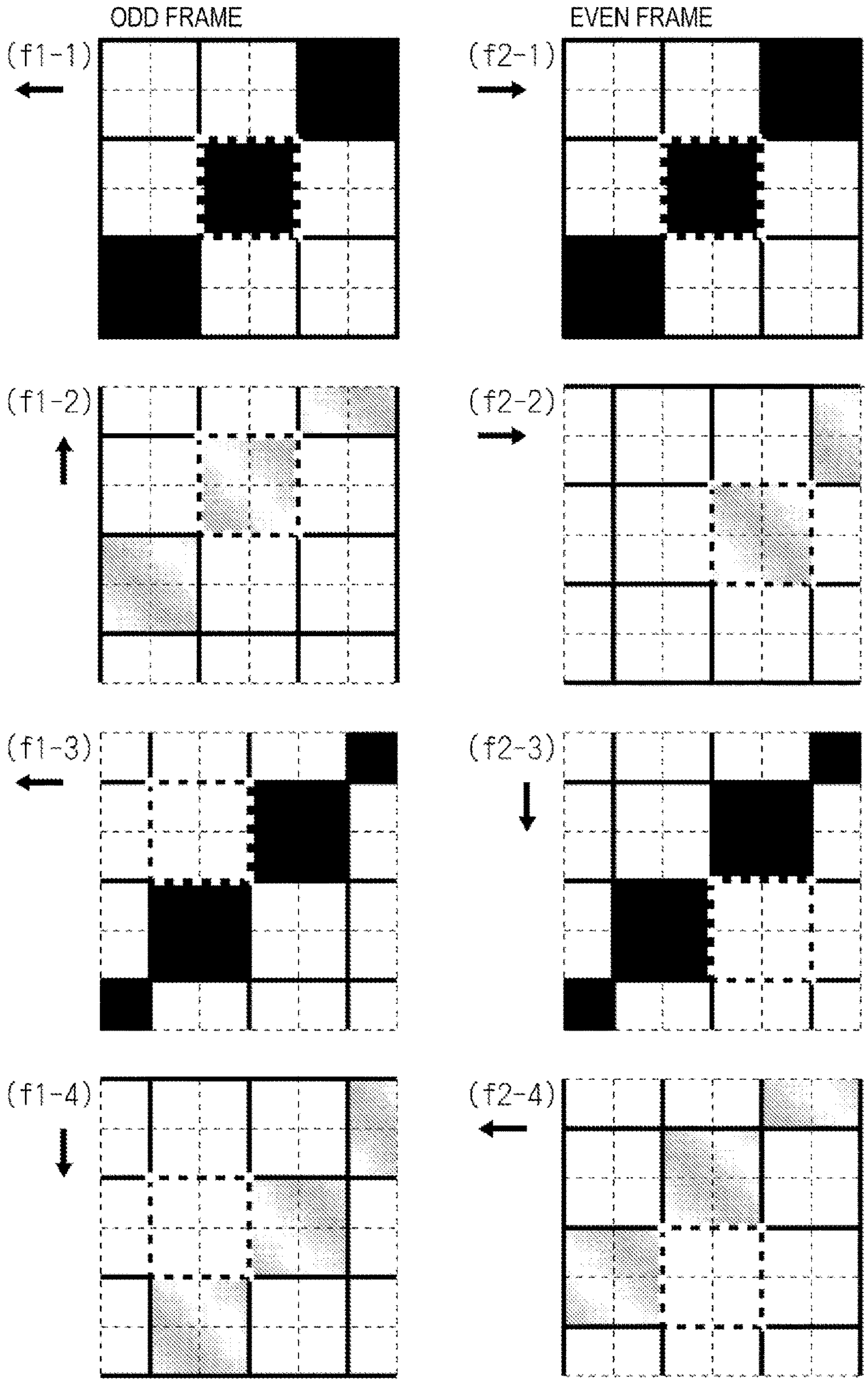
FIG. 15 is a diagram illustrating changes of the panel pixels when the specific pattern is displayed in the embodiment.

FIG. 15 is a diagram illustrating which video pixel is expressed at which projection position by the panel pixel in the unit periods f1-1 to f1-4 of the odd-numbered frame period and the unit periods f2-1 to f2-4 of the even-numbered frame period, when the video pixels forms the specific pattern.

Note that, in FIG. 15, one row of the panel pixels is added in the Y direction as compared with FIG. 9 for the purpose of description. Further, in FIG. 15, the thick dashed line indicates the panel pixel p22 expressing the black video pixel C22 in the unit periods f1-1 and f2-1. Which video pixel is expressed at which projection position in the unit periods f1-1 to f1-4 of the odd-numbered frame period and the unit periods f2-1 to f2-4 of the even-numbered frame period by the panel pixel p22 is as already described above with reference to FIG. 12 and FIG. 13.

In FIG. 15, the reason why the panel pixel p22 is illustrated in gray (hatched) in the unit periods f1-2 and f2-2 is as follows. In general, when the response of the liquid crystal elements in the liquid crystal panels 100R, 100G, and 100B is slow, the transition from black to white does not happen immediately, and the transition happens after passing through gray, which is a color between white and black. For this reason, the panel pixel transitioning from black to white is visually recognized as gray in the unit period in which the panel pixel changes from black.

Before referring to that deterioration in display quality is suppressed in the embodiment, a comparative example will be described.

In the embodiment, the frame periods are distinguished between the odd-numbered frame period and the even-numbered frame period, and the 2 times 2 video pixels expressed by one panel pixel are different between the odd-numbered frame period and the even-numbered frame period. In the comparative example, the frame periods are not distinguished between the odd-numbered frame period and the even-numbered frame period. Thus, in the comparative example, a configuration is adopted in which a single frame period is divided into four unit periods, and one panel pixel expresses 2 times 2 video pixels in each of the four unit periods. In other words, the comparative example has a configuration in which only one of the odd-numbered frame period or the even-numbered frame period is employed in the embodiment. Here, the comparative example includes only the odd-numbered frame period for the sake of convenience. In the comparative example, for example, the panel pixel p22 expresses the video pixel C22 in the unit period f1-1, the video pixel B22 in the unit period f1-2, the video pixel A22 in the unit period f1-3, and the video pixel D22 in the unit period f1-4.

Figure 16:
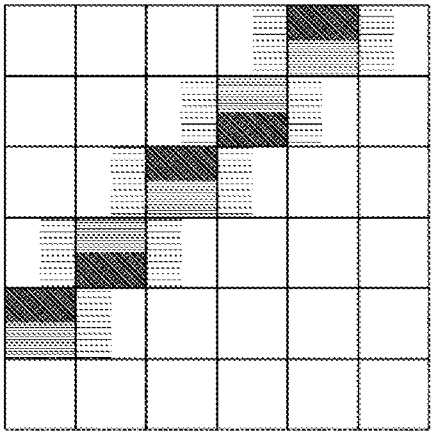
FIG. 16 is a diagram illustrating projected images in a comparative example and the embodiment.
Figure 16:
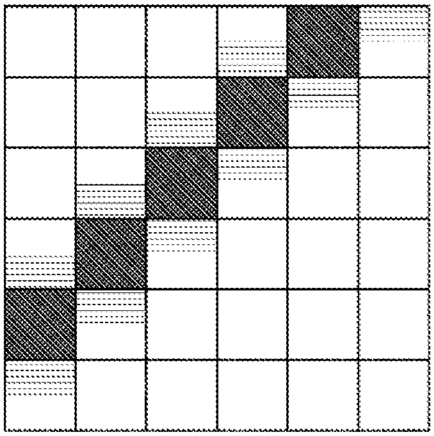

The upper field in FIG. 16 is a diagram illustrating, in a simplified manner, how the specific pattern illustrated in FIG. 14 is visually recognized by the user when projected onto the screen Scr in accordance with the comparative example. In the comparative example, the operation of the odd-numbered frame period from the unit periods f1-1 to f1-4, which is illustrated in FIG. 15, is repeated. Repeating this operation causes, on the screen Scr, brighter portions and darker portions to be unevenly displayed in the projected pixels that should be visually recognized as the diagonal line angled at 45 degrees, and as a result, causes the projected pixels to be visually recognized as a corrupted shape, as illustrated in the upper field in FIG. 16. This is due to an influence of the projected pixels (transition pixels) displayed in gray, which appear when transitioning from black to white. On the other hand, as illustrated in the lower field in FIG. 16, in the embodiment, because the projected pixels to be visually recognized as the diagonal line angled at 45 degrees are evenly influenced by the transition pixels, the projected pixels are unlikely to be visually recognized as the corrupted shape. Thus, in the embodiment, it is possible to suppress deterioration in display quality when the specific pattern is displayed.

Modified Examples and Application Examples

In the embodiment described above, various modifications or applications are possible as described below.

In the embodiments and the like, a configuration is adopted in which one frame period is divided into four unit periods. In other words, when n is the number of unit periods included in one frame period, the description above is given using n=4 as an example. n is not limited to "4", and may be "2" or greater.

In the embodiment and the like, as the specific pattern, as an example of the still image of the diagonal line formed by the black video pixels and angled at 45 degrees with the white background, the line extending in the upper right direction is used. However, it is also possible to suppress deterioration in display quality in a similar manner, even with a line extending in the upper left direction. Further, even when a diagonal line formed by white video pixels and angled at 45 degrees with a black background is used, it is possible to suppress deterioration in display quality in a similar manner.

In the embodiment and the like, the period in which the levels of the control signals P_x and P_y supplied to the optical path shifting element 230 change is the rear end period corresponding to the vertical scanning flyback period in each of the unit periods f1-1 to f1-4 and f2-1 to f2-4. However, as described above, the shift of the projection position by the optical path shifting element 230 may not be performed according to the levels of the control signals P_x and P_y, but may be accompanied by the time delay. In such a case, the level changes of the control signals P_x and P_y may be started in anticipation of the time delay, so that the image formed by the liquid crystal panel 100 in a unit period is shifted to a projection position corresponding to that unit period, for example.

Supplementary Note

For example, the following aspects of the present disclosure are understood from the embodiments illustrated above.

A projection-type display apparatus according to an aspect (a first aspect) includes a liquid crystal panel including a panel pixel, an optical path shifting element configured to shift a position of a projected pixel projected from the panel pixel in each of n unit periods from a first unit period to an n-th unit period included in one frame period, n being an integer of two or greater, and a display control circuit configured to control the liquid crystal panel and the optical path shifting element. The display control circuit supplies a data signal corresponding to pixel data constituting video data, to the panel pixel in each of the unit periods, controls the shift of the position of the projected pixel with respect to the optical path shifting element in each of the unit periods, supplies, to the liquid crystal panel, the data signal corresponding to the same pixel data and controls the position of the projected pixel to be at a same position in each of an initial first unit period of the n unit periods in a first frame period and an initial first unit period of the n unit periods in a second frame period subsequent to the first frame period, and controls the optical path shifting element to cause the position of the projected pixel in each of a second unit period to the n-th unit period of the first frame period, to be different from the position of the projected pixel in a respective one of the second unit period to the n-th unit period of the second frame period.

According to the first aspect, even when a specific display pattern appears in an image designated by the video data, deterioration in display quality can be suppressed.

In a specific aspect (a second aspect) of the first aspect, the pixel data constituting the video data is arrayed along a first axis and a second axis, and the optical path shifting element shifts the projected pixel in a direction along the first axis or a direction along the second axis in each of the unit periods.

According to the second aspect, since the direction in which the optical path shifting element shifts the projected pixel is the direction along the first axis or the second axis, a shift amount of the projected pixel in each of the unit periods can be made uniform.

In a specific aspect (a third aspect) of the second aspect, n is 4, and the optical path shifting element shifts the position of the projected pixel in one direction along the first axis from the first unit period to the second unit period of the first frame period, in one direction along the second axis from the second unit period to the third unit period of the first frame period, in the other direction along the first axis from the third unit period to the fourth unit period of the first frame period, and in the other direction along the second axis from the fourth unit period of the first frame period to the first unit period of the second frame period.

According to the third aspect, since the projected pixel is positioned at four points in the first frame period, the resolution of the projected image visually recognized by a user is artificially increased so as to be four times larger than the resolution of the liquid crystal panel. Note that, in a fourth aspect, if the four points of the projected pixel in the first frame period are shifted, for example, in the counterclockwise direction, the four points of the projected pixel in the second frame period are shifted in the counterclockwise direction. Further, one direction along an axis means one of two directions along the axis, and the other direction along the axis means the other direction of the two directions along the axis.

In a specific aspect (a fourth aspect) of the first, second, or third aspect, an array of the pixel data corresponding to the first unit period to the n-th unit period of the first frame period, and an array of the pixel data corresponding to the first unit period to the n-th unit period of the second frame period have a rotational symmetry relationship about the pixel data corresponding to the first unit period of the first frame period and the first unit period of the second frame period.

What is claimed is:

1. A projection-type display apparatus comprising:

a liquid crystal panel including a panel pixel;

an optical path shifting element configured to shift a position of a projected pixel projected from the panel pixel in each of n unit periods from a first unit period to a second unit period and through an n-th unit period, in a time sequence, included in one frame period, n being an integer of two or greater, the first unit period being an initial first unit period at a beginning of the time sequence of the frame period, the second unit period through the n-th unit period being subsequent to the initial first unit period in the time sequence; and a display control circuit configured to control the liquid crystal panel and the optical path shifting element, wherein the display control circuit:

supplies a data signal corresponding to pixel data constituting video data, to the panel pixel in each of the unit periods, controls the shift of the position of the projected pixel with respect to the optical path shifting element in each of the unit periods, supplies, to the liquid crystal panel, the data signal corresponding to the same pixel data and controls the position of the projected pixel to be at a same position in each of the initial first unit period of the n unit periods in a first frame period and the initial first unit period of the n unit periods in a second frame period subsequent to the first frame period, and controls the optical path shifting element to cause the position of the projected pixel in each of the second unit period to the n-th unit period of the first frame period, to be different from the position of the projected pixel in a respective one of the second unit period to the n-th unit period of the second frame period.

2. The projection-type display apparatus according to claim 1, wherein the pixel data constituting the video data is arrayed along a first axis and a second axis and the optical path shifting element shifts the projected pixel in a direction along the first axis or a direction along the second axis in each of the unit periods.

3. The projection-type display apparatus according to claim 2, wherein n is 4 and the optical path shifting element shifts the position of the projected pixel:

in one direction along the first axis from the first unit period to the second unit period of the first frame period, in one direction along the second axis from the second unit period to the third unit period of the first frame period, in the other direction along the first axis from the third unit period to the fourth unit period of the first frame period, and in the other direction along the second axis from the fourth unit period of the first frame period to the first unit period of the second frame period.

4. The projection-type display apparatus according to claim 1, wherein an array of the pixel data corresponding to the first unit period to the n-th unit period of the first frame period, and an array of the pixel data corresponding to the first unit period to the n-th unit period of the second frame period have a rotational symmetry relationship about the pixel data corresponding to the first unit period of the first frame period and the first unit period of the second frame period.

* * * * *